Sept. 19, 1939.  B. E. SHAW  2,173,400
DISPLAY BOARD OPERATING SYSTEM
Filed Oct. 3, 1938  2 Sheets—Sheet 1

Inventor
Burton E. Shaw
by Bair & Freeman
Attorneys

Inventor
Burton E. Shaw
by Bair & Freeman
Attorneys

Patented Sept. 19, 1939

2,173,400

UNITED STATES PATENT OFFICE 2,173,400

DISPLAY BOARD OPERATING SYSTEM

Burton E. Shaw, Bristol, Ind., assignor to Penn Electric Switch Co., Goshen, Ind., a corporation of Iowa Application October 3, 1938, Serial No. 233,141

19 Claims. (Cl. 35—49)

An object of this invention is to provide a display board operating system of simple and inexpensive construction, which system is simple to operate yet effectively simulates and displays the operating characteristics of an air conditioning plant or the like and the attendant control devices therefor.

A further object is to provide a display board having representations thereon of an air conditioning plant or the like and various control devices for the plant, a control board being provided for supporting functional control means operable to cause indication of the operation of various of the control devices and a dial which represents condition changes to which the actual control devices in an installation respond.

Another object is to provide a display board having mounted thereon a representation of a heating plant and a heating medium circulator, together with representations of control devices for the plant and circulator, the various control devices being capable of being actuated as desired and from a remote point, if desired, to illustrate various conditions of the heating plant and operations of the control devices to automatically control the heating plant and circulator.

Another important object of the invention is to provide an indicating system to indicate operation of the various control device representations and heating plant and circulator representations with which the observers are already familiar and thereby readily understand the sequences of operations possible of display on the board.

More specifically, another object of the invention is to provide the various representations with go and stop lights colored green and red respectively, in the same manner that traffic signal devices are arranged, and to provide on the control device representations (where there are a number of them and only some of them are being used), an additional light such as a white one to indicate whether or not that particular control is in use in the operation being displayed.

A further object is to provide a control board including a plurality of functional switches and selector switches for the various go and stop lights and operation-indicating lights of the display board, so that by manipulation of the switches various conditions and operations can be displayed by the various representations on the display board.

Still another object is to provide the functional switches arranged so that they can be pushed forwardly or away from the operator of the control board for the purpose of lighting the go lights of the various representations, and pulled toward the operator for energizing the stop lights as desired.

A further object is to provide circuit interconnections between the functional switches of the control board arranged so that the go and stop lights to certain of the control device representations are dependent upon positions of other functional switches in the circuit ahead of them whereby interlocked control systems can be displayed on the display board with the same interlocking arrangement of the control device representations as in an actual installation.

Another object is to provide a dial associated with the display board having a plurality of scales thereon for indicating different conditions and pointers coacting with the scales, illuminating lights being provided for selectively illuminating the scales and a motor operable as to speed and direction of operation being connected with the pointers and operable by manipulating the control devices therefor mounted on the control board.

Still another object is to provide means for simulating an explosion in a heating plant which consists of a solenoid operated firing mechanism for blank cartridges that effects throwing open of one or more doors on the heating plant representation and emission of the products of explosion therethrough after such opening.

Other objects and advantages of this invention will become apparent to those skilled in the art upon reference to the accompanying specification, claims and drawings, in which drawings Figure 1 is a perspective view of a display board and control board therefor embodying my invention;

Figure 1:
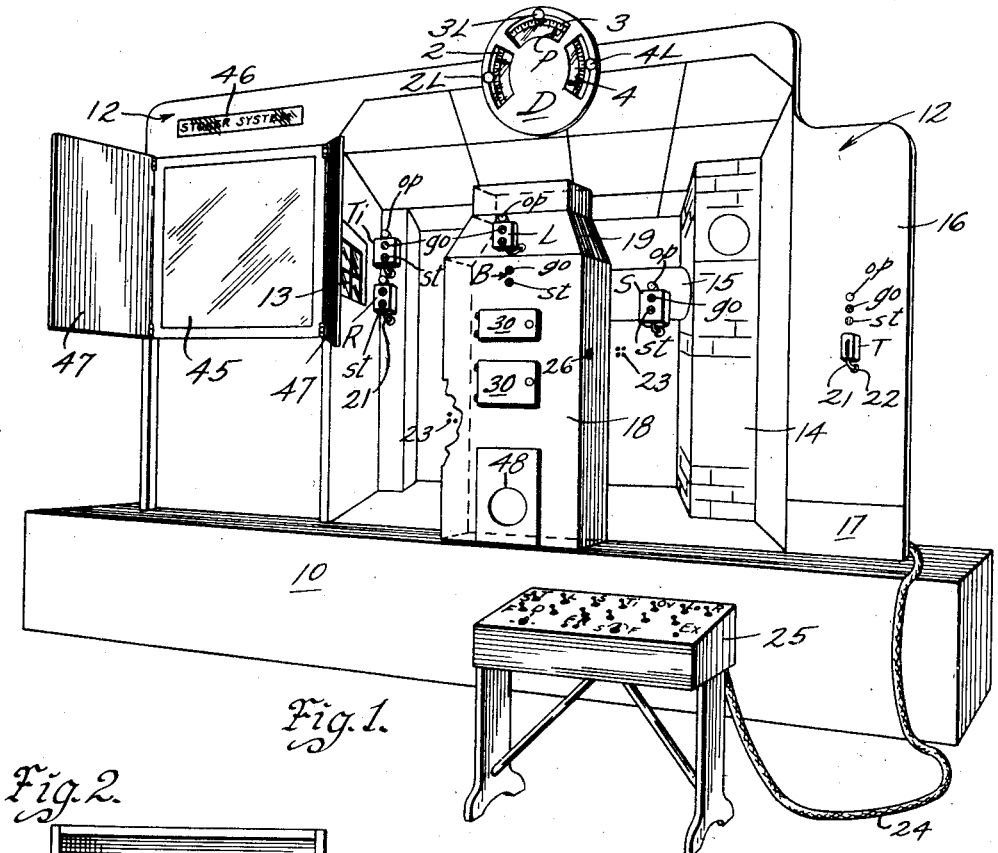
Figure 5:
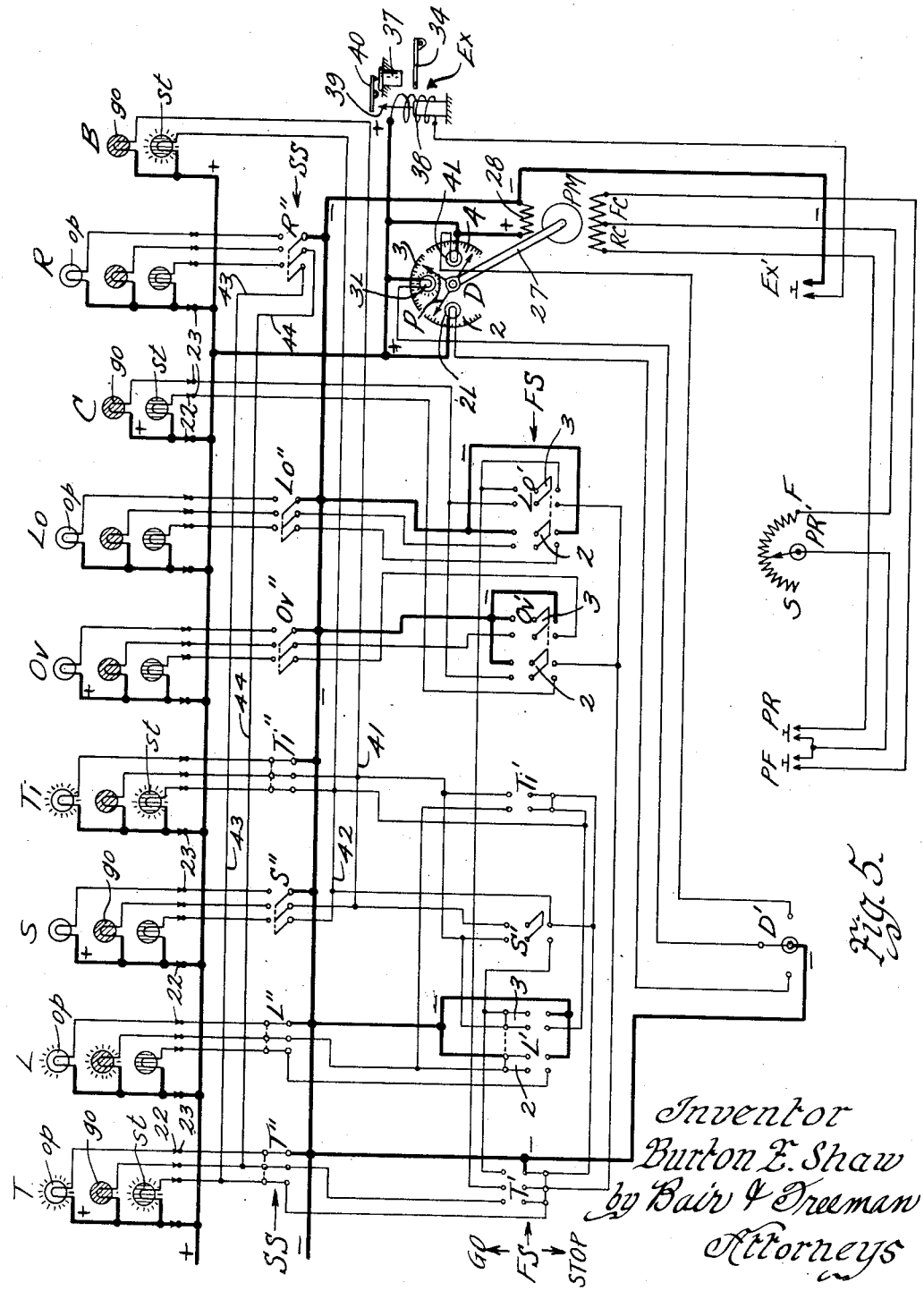

Figure 4 is a perspective view of the heating plant representation and a circulator representation associated therewith, the heating plant representation of this figure being modified with respect to that shown in Figure 1, by removal of a bonnet representation therefrom and substitution of different control representations relative thereto, and Figure 5 is an electrodiagrammatic view of my display board operating system.

On the accompanying drawings I have used the reference numeral 10 to indicate a stage or the like. A display board 12 is mounted thereon adjacent the rear of the stage 10. The stage 10 is provided to set the display board 12 at the desired elevation so that the display board is readily observable to a gathering of salesmen or distributors to whom the display is to be presented.

The display board 12 is actually a flat board although it appears to have depth on the drawing, due to a perspective painting thereon of a basement room or the like including a window 13, a chimney 14 and a stack 15. A wall 16 having a baseboard 17 is also painted on the board 12 to represent a wall in a room to which heat is supplied from the heating plant in the represented basement room.

Figure 2:
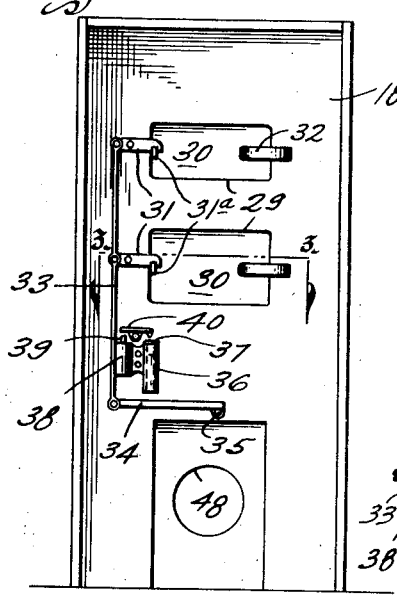
Figure 2 is an enlarged rear elevational view of a heating plant representation, the front of which is shown in Figure 1.

Sitting on the stage 10 is a heating plant representation 18 having a bonnet representation 19. These are boxlike affairs having the general appearance of a furnace and may have an open back as illustrated in Figure 2. In Figure 4, the heating plant or furnace representation 18 is shown without the bonnet representation 19, which has been omitted so that the representation 18 has the appearance of a steam or hot water furnace. An additional boxlike structure 20 to simulate a circulator representation has been placed beside the representation 18. The circulator representation 20 in this instance represents a hot water circulator, whereas when used in connection with the heating plant representation as set up in Figure 1 it would represent an air blower for a warm air system.

On the front of the heating plant representation 18 and on the front of the circulator representation 20 are lights indicated as B, (go and st) and C, (go and st), respectively. B refers to burner-indicating lights, the green one when energized indicating that the burner is going and the red one when energized indicating that it has stopped. Likewise the lights C indicate go and stop of the circulator representation 20. This system of reference characters has been used for convenience particularly in later explaining the operation of the circuit shown in Figure 5.

On the display board 12 are a series of control device representations indicated at Ti, R, L, S and T. These are respectively a timer switch for a stoker circuit, a relay which may or may not be used in connection with a given installation being presented on the display board, a limit switch, a stack switch and a room thermostat. Each of the control device representations is provided with go and stop lights go and st, respectively, and with a third light referred to on the drawings as op. The third light is preferably white and when energized indicates that that particular control device representation is in operation.

Each of the control device representations has a lead or cable 21 extending therefrom and terminating in a connecting plug 22 adapted to be plugged into the display board 12. At 23 in Figure 1 a plurality of the sockets to receive the prongs of a plug 22 are illustrated. In Figure 5, the pronged plug and sockets 23 are illustrated by arrow heads and dots likewise numbered 22 and 23. It will be noted that the circulator representation C is likewise plugged in, the prongs 22 being shown dotted in Figure 4 and the sockets 23 being visible beyond a portion forward of the left hand corner of the heating plant representation 18 in Figure 1, which has been broken away to show them. It is obvious from this arrangement how the circulator representation 20 and its indicating lights C can be removed or placed in position as desired.

The various wires from the indicating lights op, go and st, in Figure 1, are assembled in a cable 24 extending to a control board 25. The control board may thus be located at any desirable remote point and the various indicating lights controlled therefrom. The control board has a row of selector switches indicated at SS in Figure 5, and a row of functional switches indicated at FS. The selector switches are provided for throwing into the circuit any desired combination of control device representations T, L, S, Ti, Ov, Lo and R, and bear similar reference characters with the addition of ″ (double prime). The control device representations Ov and Lo refer to over run and low limit switches respectively shown in Figure 4. The over run switch representation is mounted on the top of the heating plant representation 18 to take the place of the limit switch representation L of Figure 1. The low limit switch representation Lo is arranged to be inserted in an opening 26 in the side of the representation 18 and plugged into the sockets 23 on the display board 12 thereadjacent. This arrangement makes it possible to adjust the display board and the various representations thereon to simulate different installations as desired for display presentation.

The row of functional switches FS shown in Figure 5 are indicated as T', L', S', Ti', Ov' and Lo'. The functional switches FS are for controlling the go and st lights of the control device representations T, L, S, Ti, Ov and Lo, respectively. They may be thrown forwardly, as indicated by the arrow GO, to cause the go light of any desired control device representation to be energized or thrown rearwardly as indicated by the arrow STOP for energizing the st light of the desired control device representation.

The main current carrying wires from the source of supply are shown by heavy lines in the diagram and indicated as + and − (plus and minus or positive and negative), merely for convenience, as the circuit of course can be operated with alternating current as well as direct current. The switch T' is a triple pole double throw switch for connecting the minus lead with either the go or stop contacts by throwing the switch forwardly or rearwardly. The switches L', Ov' and Lo' are four pole double throw switches each comprising two double pole, double throw switches indicated as 2 and 3. The switch 2 shorts the go contacts of the functional switch when it is thrown forwardly and shorts the stop contacts thereof when it is thrown downwardly. The switches 2 and 3 are mechanically connected together, as indicated by dotted lines for simultaneous operation but electrically independent of each other. Likewise, the switches S' and T' short the go and stop contacts when thrown forwardly or rearwardly respectively.

The selector switches SS are merely triple pole single throw switches for establishing the circuit from the minus lead of the circuit supply continuously through the operation indicating lights op to the plus lead and for closing the circuits through the go and st lights, dependent upon the positions of the functional switches.

On the display board 12 I mount a dial representation D having a plurality of scales indicated at 2, 3 and 4. Indicating lights are illustrated at 2L, 3L and 4L, which may be selectively energized so that only one of the dials at a time may be indicated as in operation to show a certain change in condition. By way of example, the scale 2 may indicate furnace temperature, the scale 3 may indicate room temperature and the scale 4 may indicate voltage. A switch D' is provided for the dial D and has three separate contacts, one for each of the lights 2L, 3L and 4L.

A plurality of pointers P are provided for the scales 2, 3 and 4 which, as shown in Figure 5, are connected together for simultaneous movement. They are advanced in the desired direction across the scales by a shaft 27 and a pointer motor PM, suitable step-down gearing of course being utilized to slow down the speed of the pointers. The pointer motor PM is of the modulating reversing type having a continuously energized primary coil 28 and a pair of secondary coils for forward and reverse action, indicated as FC and RC, respectively. The coils FC and RC are selectively energized by push buttons referred to as PF and PR for pointer forward and pointer reverse operations. A pointer rheostat PR' is arranged in the circuit so that the speed of movement of the pointers across the scales may be regulated as desired. The rheostat PR' has slow and fast indications at S and F, respectively.

Figure 3:
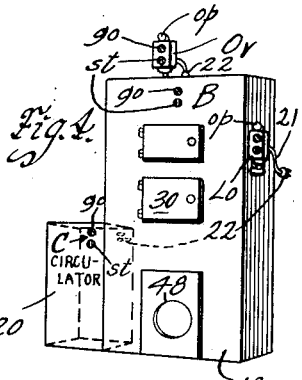
Figure 3 is an enlarged sectional view on the line 3—3 of Figure 2 showing an explosion-opened door of the heating plant representation.

In Figures 2 and 3 I illustrate an explosion simulating apparatus consisting of the following described mechanism. A pair of door openings 29 is provided in front of the heating plant representation 18. The doors 30 are hinged so as to normally close these openings and remain in closed position. The doors are retained in closed position by latches 31 engaging notched fingers 31a extending from the doors. Leaf springs 32 tend to open the doors whenever the latches are released. The latches 31 are operatively connected by a rod 33 to a plate 34. The plate 34 is pivoted at 35. A tube or barrel 36 is mounted above the plate 34 and is adaptable to receive a blank cartridge 37. A solenoid 38 when energized causes a pin 39 to be thrown upwardly and rock a firing lever 40 for firing the cartridge 37.

The barrel 36 being directed toward the plate 34 causes the products of explosion from the cartridge 37 to force the plate 34 downwardly thereby releasing the latches 31. The products of combustion are therefore expelled through the door openings 29, as they are located immediately above the plate 34 and the heat generated by the explosion causes the smoke thereof to rise and, because of the pressure in the heating plant representation 18, be blown out through the open doors.

The explosion simulating mechanism just described has been referred to generally by the reference character Ex. A push button Ex' is provided for controlling the circuit thereto. Whenever the push button closes the circuit, the solenoid 38 is energized for firing the cartridge 37.

The selector switch row and the functional switch row are indicated at S and F on the control board 25 adjacent the left hand side thereof. Various of the reference characters used in Figure 5 have been abbreviated on the control board 25 of Figure 1 because of its small scale. It is believed, however, that the various switches, push buttons, etc. are clearly illustrated in Figure 1 so that the operation of the system can now be described mostly by reference to Figure 5.

PRACTICAL OPERATION

In the operation of my display system, the selector switches SS must be first set for the particular installation to be displayed and explained. The operation of various systems is possible with the disclosed arrangement, such as, (1) a simple coal stoker system; (2) an oil burner system, or (3) either of these systems combined with a circulator for the heating medium.

*(1) Stoker control system*

When this system is to be represented, the selector switches T'', L'' and Ti'' are closed, as shown in Figure 5. This will cause lighting of the *op* and *st* lights of the control device L when the switches T' and Ti' are in normal stop position and the switch L' is in normal go position as illustrated. The other selector and functional switches not being used are illustrated in open positions.

When the temperature of a room goes down the room thermostat closes the burner circuit in an actual installation, and this can be simulated with my display system by changing the switch T' from stop to go position. This will de-energize the *st* light and energize the *go* light of the control device T. The circuit from the minus lead through the switches T' and T'' and the stop and go lights of the device T are readily traceable to the plus lead. In an actual installation, "go" by the room thermostat causes the burner to operate. Likewise in my display system the go position of the switch T' furnishes current from the minus lead through the upper right contact of the switch through the switch 3 of the limit switch L' and then to a burner wire 41 extending to the *go* light of the burner representation B. In going through the switch 3 of the light switch L', it is obvious that "go" of the burner B is dependent upon the switch L' being in go position, which is the normal position of a limit switch in an actual installation, as it moves to stop position only by excessive temperature generated in the heating plant 18. Therefore the series connection of the thermostat T' and limit switch L' are the same in my display system as in an actual installation, so that there is an interlocking connection between the controls due to this circuit arrangement or interconnection. Whenever the thermostat T is explained as being satisfied, then the operator of the control board 25 moves the switch T' to stop position.

If before the thermostat is satisfied the limit switch moves to stop position in an actual installation, then the operator of the control board moves the limit switch of the control board to stop position, thus deenergizing the *go* lights of L and B and energizing the *st* lights thereof.

In a stoker system there is usually a timer switch operable to periodically energize the stoker so that in mild weather, when there are few or no calls for heat by the room thermostat, the timer will prevent the fire from going out. Likewise in my display system if the timer switch T' is moved from stop to go position, current from the minus lead through the switch 2 of the limit switch L' will pass through the upper contacts of the timer switch Ti' to the lead 41 of the burner light *go*. Here again it is evident that the operation of the burner or stoker representation is dependent upon the limit switch L' being in go position, as in an actual installation.

*(2) Oil burner system*

In the operation of an oil burner system the selector switches T'', L'' and S'' are closed. The thermostat and limit switch representations T and L will be the same as previously described in connection with a stoker system. The switch S is a safety or stack switch which is normally in go position after the burner is placed in satisfactory operation, but returns to stop position if the fire goes out and the stack cools down. Whenever the stack switch representation S is to indicate stop, then the functional switch S' is swung from its normal forward position to its rearward position. In its forward position it permits current from the minus lead of the functional switch T' to pass through the switch 3 of the limit switch L' to the burner lead 41. In its rearward position it permits the current from the switch T' to pass by the switch 3 to L' and bridge the lower contacts of the switch S' and then go to a burner lead 42 for energizing the *st* light of B.

(3) *A coal stoker or oil burner system with heating medium circulator*

In connection with either of the systems described under (1) and (2), the circulator 20 may be used and the proper selector switches as already described will be closed in addition to the selector switches Ov'' and Lo''. The functional switches Ov' and Lo' are normally in stop positions. As the heating plant warms up, the functional switch Lo' is moved to go position when the temperature of the plant is sufficient to justify circulation of the heating medium. The switches 2 and 3 of Lo' will energize respectively the *go* light of the Lo control device and the *go* light of the circulator device C. Current for the *go* light of C will be supplied from the minus lead through the upper center contact of the functional switch T', so that it is evident that operation of the circulator in response to the low limit control Lo is dependent upon the thermostat T being closed. This gives an interlocking connection which de-energizes the *go* light of the device C when the functional switch T' is swung to stop position, and energizes the *st* light thereof through the center lower contact of the functional switch T' and the switch 2 to the over run switch Ov'.

When there is an excessive temperature developed in a heating plant, it is desirable in order to dissipate the heat that the circulator be operated. This is accomplished by moving the functional switch Ov' forwardly to go position so that the switch 2 thereof energizes the *go* light of C and the switch 3 thereof energizes the *go* light of Ov. When the temperature again recedes a sufficient degree, then the switches 2 and 3 re-energize the *st* lights of C and Ov.

In connection with explanation of the operation of the display system, the operator also uses the dial D to show different changes in conditions. For instance, if he wants to show changes in room temperature he manipulates the switch D' to cause illumination of the light 3L so that only the scale 3 will be illuminated, and this would preferably be graduated in degrees of room temperature. The operator can cause the pointer P of the scale 3 to move forwardly or rearwardly as desired, and at the speed desired, by proper manipulation of the controls PF, PR and PR'.

Thus, when it is desired to have the thermostat T indicate go instead of stop at a desired temperature, such as 68°, indicated on the scale 3 the operator can push the button PR and, when the pointer of the scale 3 reaches 68, throw the functional switch T' from stop to go position. Likewise, furnace temperature on the scale 2 can be indicated when operating the functional switches L', Ov' or Lo'.

*Relay operation*

In most heating plant installations, relays are used for operating the burner and in turn are operated by the thermostat. The control device representation R is therefore provided, and when its selector switch R'' is closed its *op* light will be continuously energized and its *go* and *st* lights energized simultaneously with the respective *go* and *st* lights of the thermostat T. This is accomplished by leads 43 and 44 which provide shunt circuits for the *go* and *st* lights of R relative to the *go* and *st* lights of T.

The scale 4 may indicate voltage change so that operation of the relay R for low voltage protection can be explained. When the pointer P of the scale 4 goes down to seventy volts, the functional switch T' may be moved from go to stop position to indicate drop out of the relay. When the voltage again goes up to ninety, as represented on the scale 4, then the switch T' may be returned from stop to go position to indicate that the relay again pulls in.

In some heating plant installations, the controls if not properly installed can result in an explosion due for instance to combustible fuel being introduced into the combustion chamber and ignition being thereafter established. This can be demonstrated by closing the switch Ex' which results in discharge of the cartridge 37 and the attendant noise and expulsion of smoke and other products of explosion and also opening of the doors 30.

My display board and system are particularly adapted for presenting the operation of heating or other air conditioning plant controls to a group of dealers or distributors. The various control device representations, such as T, L, etc., may be actual casings of production devices so as to give the appearance of such devices and merely have added thereto the indicating lights *op*, *go* and *st* to indicate various operations of these devices and the attendant operations of the heating plant representation 18 and the circulator 20. The apparatus, however, can be changed to display other systems and/or installations with a minimum of modification and a simple rearrangement of the circuit to secure the desired interlocking of various control devices relative to each other.

My display board and system is also readily adaptable to a complete presentation of the subject being explained by the use of a projecting screen 45 and a title screen 46 on which various pictures and titles, such as "Stoker system" shown in Figure 1, can appear. A pair of door elements 47 serve as light shields and protectors for the screen 45 when in open and closed positions respectively. On the screen 45 various pictures enlarged by a projector can be thrown, such as enlarged interior views of the control devices T, L, etc., pictures of typical control installations, and the like.

The heating plant representation 18 preferably has in the front thereof an opening 48 into which a nozzle of a stoker or oil burner may be thrust so that the stoker or oil burner mechanism itself is supported in front of the member 18 in a realistic manner.

My apparatus as disclosed is readily operable in a realistic manner to illustrate various conditions and operations of automatic control devices in response thereto. When operated in connection with a verbal explanation of various phases of a heating plant installation or the like, it is a very effective means to fully present the problems of an air conditioning engineer and illustrate how certain combinations of controls can automatically take care of various contingencies that arise, and avoid certain undesirable results, such as explosions and the like.

My invention has been described in the foregoing specification and illustrated in the drawings more or less precisely as to details. It is to be understood, however, that changes may be made in the arrangement and proportions of parts and equivalents may be substituted without departing from the spirit and scope of the invention as set forth in the appended claims.

What I claim and desire to secure by Letters Patent of the United States is:

1. In a display board operating system, a display board having representations of a heating plant, a heating medium circulator and control devices thereon for operating the represented heating plant and heating medium circulator, a control board for said representations, said control device representations each having operation, go and stop indicating means, said heating plant and heating medium circulator representations having go and stop indicating means, said control board having functional control means for operating the indicating means of said control device representations, whereby movement of said functional control means for any one of said control device representations causes corresponding operation of its indicating means and operation of the corresponding indicating means of said heating plant and heating medium circulator representations simultaneously therewith.

2. In a display board operating system, a display board having thereon representations of an air conditioning plant or the like and a conditioning medium circulator, the operations of which are to be displayed and control device representations for effecting control of said air conditioning plant and conditioning medium circulator representations, said air conditioning plant and conditioning medium circulator representations having go and stop indicating means, and said control device representations having operation, go and stop indicating means and functional control means for controlling said indicating means so that the go and stop indicating means of said air conditioning plant and conditioning medium circulator representations operate simultaneously with the movement of one of said functional control means corresponding to one of said control device representations to go or stop positions respectively.

3. In a display board operating system, a display board having a representation of a heating plant and control devices thereon for operating the represented heating plant, a control board for said representations, said control device representations each having operation, go and stop indicating means, said heating plant representation having go and stop indicating means, said control board having functional control means for operating the indicating means of said control device representations, whereby movement of said functional control means for any one of said control device representations causes corresponding operation of its indicating means and, simultaneously therewith, operation of the corresponding indicating means of said heating plant representation.

4. In a display board operating system, a display board having thereon representations of an air conditioning plant or the like, the operations of which are to be displayed and control device representations for effecting control of said air conditioning plant, said air conditioning plant representations having go and stop indicating means, and said control device representations having operation, go and stop indicating means, functional control means for controlling said indicating means so that the go and stop indicating means of said air conditioning plant representation operate simultaneously with the movement of one of said functional control means corresponding to one of said control device representations to go or stop positions respectively.

5. In a display board, a display board having thereon representations of an air conditioning plant or the like, the operations of which are to be displayed and control device representations for effecting control of said air conditioning plant, said air conditioning plant representations having go and stop indicating means, and said control device representations having operations, go and stop indicating means, each go and stop indicating means being operable only when its respective operation indicating means is in operation, functional control means for controlling said indicating means so that the go and stop indicating means of said air conditioning plant representation and said control device representations operate simultaneously with the movement of one of said functional control means to go or stop positions respectively.

6. In a display board operating system, a display board having thereon representations of an air conditioning plant or the like, the operations of which are to be displayed and control device representations for effecting control of said air conditioning plant representation, said air conditioning plant representation having go and stop indicating means, said control device representations having operation, go and stop indicating means, functional control means for controlling said indicating means so that the go and stop indicating means of said air conditioning plant representation are operated by movement of one of said functional control means corresponding to one of said control device representations to go or stop positions respectively, said functional control means being interconnected whereby certain units thereof are dependent on other units being in go or stop positions before said certain units can be effective to operate said representation indicating means.

7. In a display board operating system, a display board having thereon representations of an air conditioning plant or the like, the operations of which are to be displayed, and control device representations for effecting control of said air conditioning plant representation, said air conditioning plant representation having go and stop lights and said control device representations having operation, go and stop lights and functional control switches for controlling said indicating lights so that the go and stop lights of said air conditioning plant representation are energized by movement of one of said functional control switches corresponding to one of said control device representations to go or stop positions respectively.

8. In a display board operating system, a display board including representations of an air conditioning plant or the like and a conditioning medium circulator, the operations of which are to be displayed and control device representations for effecting control of said air conditioning plant and conditioning medium circulator representations, said air conditioning plant and conditioning medium circulator representations having go and stop indicating means, and said control device representations having operation, go and stop indicating means, functional control means for controlling said indicating means so that the go and stop indicating means of said air conditioning plant and conditioning medium circulator representations operate simultaneously with the movement of one of said functional control means corresponding to one of said control device representations to go or stop positions respectively, said functional control means being interconnected whereby certain units thereof are dependent on other units being in go or stop positions before said certain units can be effective to operate said representation indicating means.

9. In a display board operating system, a display board having thereon representations of an air conditioning medium circulator, the operations of which are to be displayed, and control device representations for effecting control of said air conditioning plant and conditioning medium circulator representations, said air conditioning plant and conditioning medium circulator representations having go and stop lights and said control device representations having operation, go and stop lights and functional switches for controlling said indicating lights so that the go and stop lights of said air conditioning plant and said conditioning medium circulator representations are energized simultaneously by movement of one of said functional control switches corresponding to one of said control device representations to go or stop positions respectively.

10. In a display board operating system, a display board including representations of an air conditioning plant or the like and a conditioning medium circulator, the operations of which are to be displayed, and control device representations for effecting control of said air conditioning plant and conditioning medium circulator representations, said air conditioning plant and conditioning medium circulator representations having go and stop lights and said control device representations having operation, go and stop lights and functional control switches for controlling said indicating lights so that the go and stop lights of said air conditioning plant and said conditioning medium circular representations are energized simultaneously by movement of one of said functional control switches corresponding to one of said control device representations to go or stop positions respectively, said functional switches having circuit interconnections whereby certain units thereof are in series with other units thereof and are thereby dependent on said other units being in go or stop positions before said certain units can be effective to close the circuit through the respective go and stop lights of said representations.

11. In a display board operating system, a display board having thereon representations of an air conditioning plant or the like, the operations of which are to be displayed, and control device representations for effecting control of said air conditioning plant representation, said air conditioning plant representation having go and stop lights and said control device representations having operation, go and stop lights and functional control switches for controlling said indicating lights so that the go and stop lights of said air conditioning plant representation are energized by movement of one of said functional control switches corresponding to one of said control device representations to go or stop positions respectively, said functional switches having circuit interconnections whereby certain units thereof are in series with other units thereof and are thereby dependent on said other units being in go or stop positions before said certain units can be effective to close the circuit through the respective go and stop lights of said representations.

12. In a display board operating system, a display board having thereon a representation of an air conditioning plant or the like and control device representations for effecting control of said air conditioning plant representation, functional control means for effecting selective control of said representations, a dial having a plurality of scales representing condition changes, means for selectively illuminating said dials to indicate thereby the changes in a condition corresponding to a desired control device representation being demonstrated, a pointer cooperating with each scale, a motor for operating said pointers, control switches for selectively energizing said motor in a forward or a reverse direction, and means for controlling the speed of said motor and thereby the speed of traverse of said pointers across said scales.

13. In a display board operating system, a display board having thereon a representation of an air conditioning plant or the like and control device representations for effecting control of said conditioning plant representation, functional control means for effecting selective control of said representations, a dial having a scale representing condition changes, a pointer cooperating with said scale, a motor for operating said pointer, control switches for selectively energizing said motor in a forward or a reverse direction, and means for controlling the speed of said pointer across said scale.

14. In a display board operating system, a display board including representations of a heating plant or the like, control device representations for effecting control of said heating plant representation, functional control means for effecting selective control of said representations, a dial having a scale representing temperature changes, a pointer cooperating with said scale, a motor for operating said pointer and control switches for selectively energizing said motor in a forward or a reverse direction.

15. In a display board operating system, a display board having thereon representations of an air conditioning plant or the like and a conditioning medium circulator, control device representations thereon for effecting control of said conditioning plant and conditioning medium circulator representations, functional control means for effecting selective control of said representations, a dial having a plurality of scales representing condition changes, means for selectively illuminating said dials to indicate thereby the changes in a condition corresponding to a desired control device representation being demonstrated, a pointer cooperating with each scale, a motor for operating said pointers and control switches for selectively energizing said motor in a forward or a reverse direction.

16. In a display board operating system, a display board having thereon representations of a heating plant and control devices for the heating plant representation, indicating means for the heating plant representation and for the control device representations, explosion indicating means for said heating plant, and functional control means for said indicating means, said explosion indicating means comprising a spring-opened door on said heating plant representation, a latch for said door, a movable plate operatively connected therewith, means for supporting a blank cartridge in position for discharge against said plate, said plate being adjacent said door, whereby the products of explosion may issue therethrough after the door is opened by discharge of a blank cartridge against said plate, electrically operated means for firing said cartridge, said functional control means including a switch for establishing a circuit through said electrically operated means.

17. In a device of the class described, a representation of a heating plant and control devices for the heating plant representation, indicating means for the heating plant representation and for the control device representations, explosion simulating means for said heating plant representation, functional control means for said indicating means, said explosion simulating means comprising a normally open door on said heating plant representation, a latch for said door, means for supporting a blank cartridge in position for releasing said latch upon discharge of said cartridge, and electrically operated means for firing said cartridge, said functional control means including a switch for establishing a circuit through said electrically operated means.

18. In a display board operating system, a display board having thereon representations of a heating plant and control devices for the heating plant representation, operation indicating means for the heating plant representation and for the control device representations, explosion indicating means for said heating plant, and functional control means for all of said indicating means, said explosion indicating means comprising a normally open door on said heating plant representation, a latch for said door, a movable plate operatively connected therewith, means for supporting a blank cartridge in position for discharge against said plate, and electrically operated means for firing said cartridge, said functional control means including a switch for establishing a circuit through said electrically operated means.

19. In a display board operating system, a display board having thereon a representation of a heating plant, explosion indicating means for said heating plant comprising a spring-opened door on said heating plant representation, a latch for said door, a movable plate operatively connected therewith, means for supporting a blank cartridge in position for discharge against said plate, said plate being adjacent said door, whereby the products of explosion may issue therethrough after the door is opened by discharge of a blank cartridge against said plate, electrically operated means for firing said cartridge and a switch for establishing a circuit through said electrically operated means.

BURTON E. SHAW.